(12) United States Patent
Cheng et al.

(10) Patent No.: US 10,219,000 B1
(45) Date of Patent: Feb. 26, 2019

(54) TIME STAMP RECOVERY AND FRAME INTERPOLATION FOR FRAME RATE SOURCE

(71) Applicant: Pixelworks, Inc., Portland, OR (US)

(72) Inventors: Guohua Cheng, Shanghai (CN); Yue Ma, Pleasanton, CA (US); Bob Zhang, Santa Clara, CA (US); Minghui Yang, Shanghai (CN); Neil Woodall, Newport Beach, CA (US); Xuan Wu, Dublin, CA (US)

(73) Assignee: PIXELWORKS, INC., Portland, OR (US)

( * ) Notice: Subject to any disclaimer, the term of this patent is extended or adjusted under 35 U.S.C. 154(b) by 405 days.

(21) Appl. No.: 14/920,673

(22) Filed: Oct. 22, 2015

(51) Int. Cl.
| | |
|---|---|
| *H04N 5/14* | (2006.01) |
| *H04N 7/01* | (2006.01) |
| *H04N 19/52* | (2014.01) |
| *H04N 19/105* | (2014.01) |
| *H04N 19/139* | (2014.01) |
| *H04N 19/172* | (2014.01) |
| *H04N 19/513* | (2014.01) |

(52) U.S. Cl.
CPC .............. *H04N 19/52* (2014.11); *H04N 5/145* (2013.01); *H04N 7/014* (2013.01); *H04N 7/0127* (2013.01); *H04N 19/105* (2014.11); *H04N 19/139* (2014.11); *H04N 19/172* (2014.11); *H04N 19/521* (2014.11)

(58) Field of Classification Search
CPC .... H04N 19/52; H04N 19/105; H04N 19/139; H04N 19/172; H04N 19/521; H04N 5/145; H04N 7/0127; H04N 7/014
USPC ..................................................... 375/240.16
See application file for complete search history.

(56) References Cited

U.S. PATENT DOCUMENTS

| | | | |
|---|---|---|---|
| 2011/0013081 A1* | 1/2011 | Wredenhagen | ...... H04N 7/0112 348/449 |
| 2011/0109796 A1* | 5/2011 | Subedar | ................. H04N 5/145 348/459 |
| 2015/0319406 A1* | 11/2015 | Brasnett | ................. H04N 7/012 348/448 |

* cited by examiner

*Primary Examiner* — On S Mung
(74) *Attorney, Agent, or Firm* — Miller Nash Graham & Dunn LLP

(57) ABSTRACT

A method of performing motion vector correction in a sequence of video frames includes receiving, at a processor, a frame of video frames at a received rate lower than an original frame rate, identifying motion vector candidates for a frame in the sequence of video frames, detecting a cadence of the sequence of video frames using the motion vector candidates, scaling the motion vector candidates according to the cadence to produce scaled motion vector candidates, calculating motion vectors for a frame in the sequence of video frames using the scaled motion vector candidates, and interpolating at least one new frame of video data using the motion vectors.

13 Claims, 5 Drawing Sheets

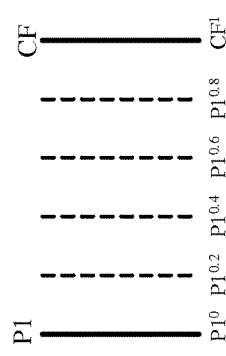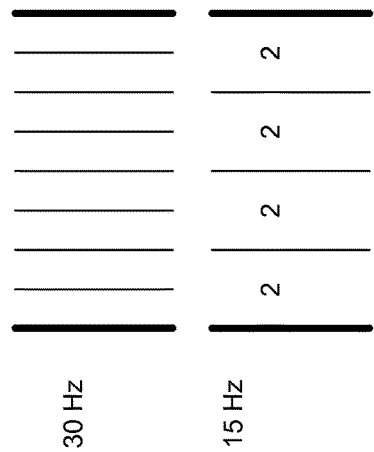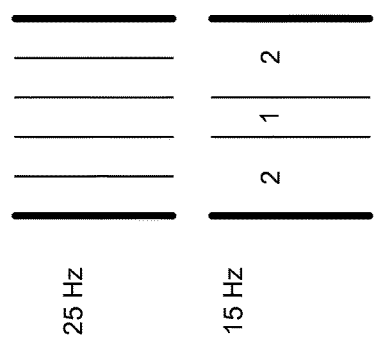
FIGURE 2
FIGURE 3
FIGURE 4
FIGURE 5

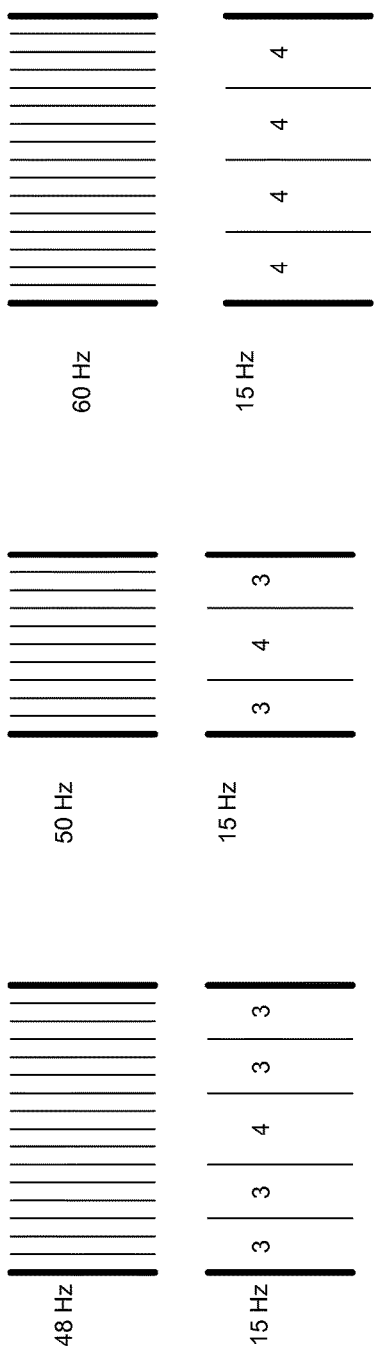
FIGURE 6
FIGURE 7
FIGURE 8
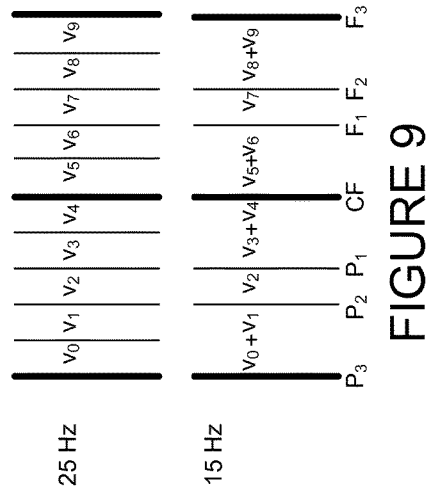
FIGURE 9

TIME STAMP RECOVERY AND FRAME INTERPOLATION FOR FRAME RATE SOURCE

BACKGROUND

Internet videos generally have low frame rates, typically 15 Hz. Because the low frame rate, these video sources need motion estimation and motion compensation (MEMC) based frame rate conversion (FRC). Frame rate conversion is the process of converting from one frame rate to the other. Typically, this involves adding frames between existing frames to increase the frame rate, although it can involve dropping frames as well.

The low frame rate videos may result from several different frame rates such as 60 Hz, 30 Hz, 25 Hz and 24 Hz. This means that the dropping of frames to get to the resulting low frame rates may vary widely, leading to uneven dropping and incorrect time stamps. This makes motion vectors for an object uneven, regardless of whether the object velocity is constant. Some frames will have motion vectors that are higher than expected and others will have motion vectors lower than expected, or high-low motion. High low/motion degrades normal MEMC quality for several reasons. For example, the three-dimensional recursive motion vector calculation (MVC) method is less accurate because motion vectors calculated from previous frames are not the correct value for the current frame. Also, halo reduction logic is invalid because it compares motion vectors from the previous or future frames to current frame to detect cover and uncover areas. Another problem results from the output of the frame interpolation still containing high-low motion because the time between frames is uneven.

Therefore, it would be desirable to detect the cadence of low frame rate video and to use the detected cadence to correct the high-low motion in the motion vector calculations and frame interpolation portions of MEMC.

SUMMARY

One embodiment is a method of performing motion vector correction in a sequence of video frames that includes receiving, at a processor, a frame of video frames at a received rate lower than an original frame rate, identifying motion vector candidates for a frame in the sequence of video frames, detecting a cadence of the sequence of video frames using the motion vector candidates, scaling the motion vector candidates according to the cadence to produce scaled motion vector candidates, calculating motion vectors for a frame in the sequence of video frames using the scaled motion vector candidates, and interpolating at least one new frame of video data using the motion vectors.

BRIEF DESCRIPTION OF THE DRAWINGS

FIG. 2 shows a graphical representation of interpolated frames between a previous frame and a current frame.

FIGS. 3-8 shows a graphical representation of frame dropping from different rates to get to 15 Hz.

FIG. 9 shows a graphical representation of motion speeds.

DETAILED DESCRIPTION OF THE EMBODIMENTS

Figure 1:
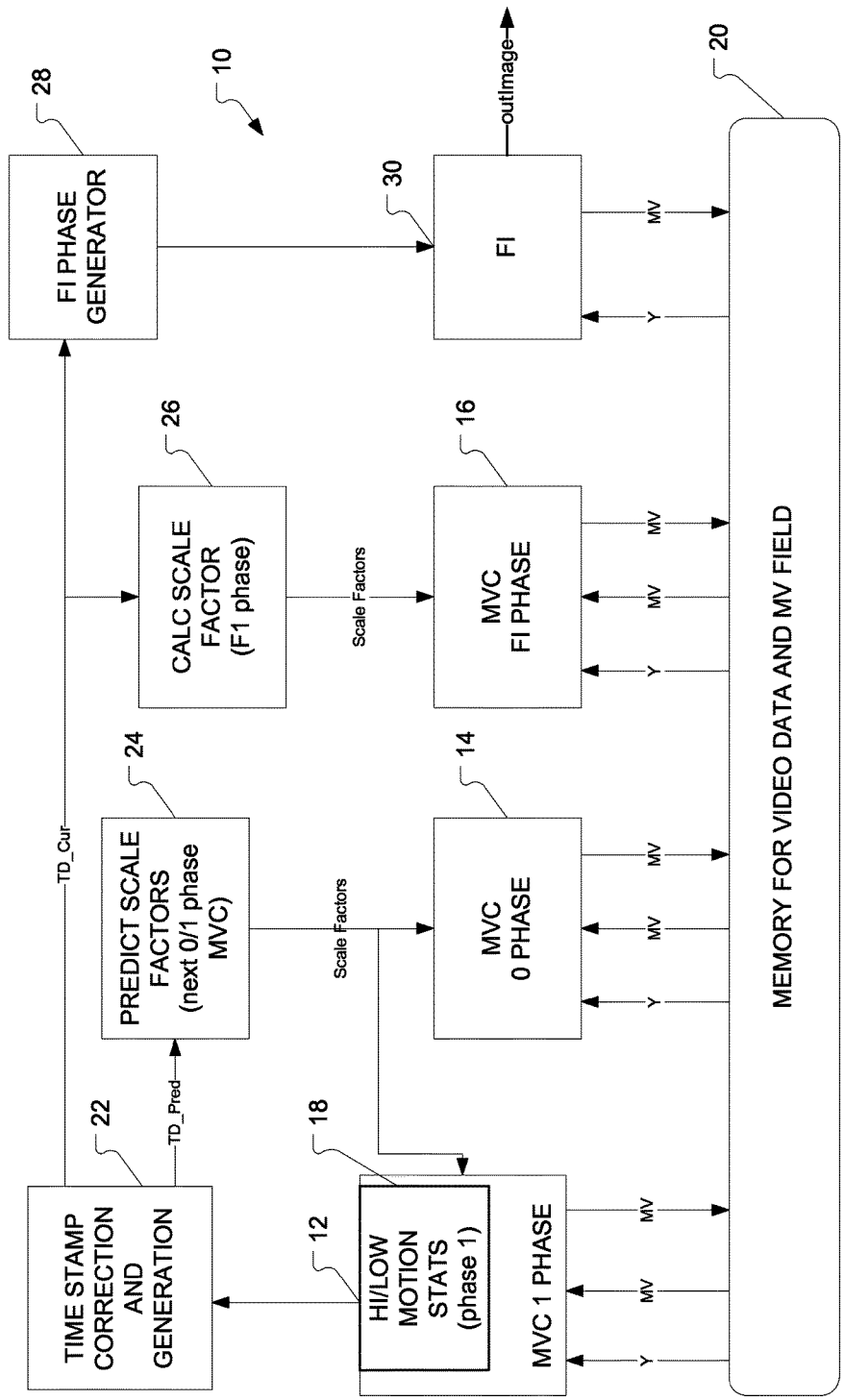
FIG. 1 shows an embodiment of a low frame rate cadence detection system.

FIG. 1 shows one embodiment of a diagram for low frame rate FRC 10. In the discussion P1 denotes the past frame and CF denotes the current frame and MVC is doing the estimation between those two frames. The system may implement these modules as software running on a processor, dedicated circuitry, or a combination of the two. The modules may include at least one motion vector calculation (MVC) module; time stamp correction and generation; scale factors calculation; and frame interpolation (FI).

The MVC modules 12, 14 and 16 in the example of FIG. 1 calculate the motion vector or vectors between neighboring CF (current frame) and P1 (most previous frame) frames. FIG. 1 shows three modules, but in reality the hardware may only implement one module and use it several times. The MVC modules may perform phase 1 MVC first. Phase 1 is when the anchor frame is CF and the target frame is P1, and MVC searches for matching blocks of pixels in P1 for each grid block in CF. MVC for Phase 0, in which the previous frame P1 is the anchor frame and the blocks of pixels are being searched in the current frame (CF), may be performed first instead of Phase 1. The MVC will then find FI phase in which the anchor frame is located in time between CF and P1 motion vectors next. The FI phase generator block determines the FI phases for the MVC to use. To recover the correct time stamp, additional logic 18 is added to the MVC block to detect the high-low motion. High-low motion is detected when a motion vector has either higher or lower than expected motion because of the dropped frames. The added logic will generate statistical information for use by the time stamp correction and generation block. The MVC modules use a memory 20 to store video data (Y) and the motion vector (MV) field data.

The time stamp correction and generation module 22 uses the high-low motion statistics generated in the MVC block to determine the time step. In one embodiment, the process finds the correlation pattern of the high-low motion, in another the process matches the high-low motion with predefined templates. After the process determines the correct template, it finds the time step according to current high-low motion value.

The scale factor modules 24 and 26 scale the previous MV information to eliminate the high-low pattern. The existing MVC module assumes that the current MV for a block has the same value as MV block in the previous frame. Because of this, the modified MVC process scales the previous MV to provide a correct MV candidate in the 3D recursive algorithm. After scaling the MV information from the previous frame, MVC will have better recursive and halo reduction performance.

FI phase generator 28 generates FI phases that have a constant period according to the calculated time stamp. The FI phases will be used by both the MVC modules and FI 30. In some implementations, MVC only calculates the 0/1 phases and FI block will interpolate the MV field to generate MV's at the interpolated field.

This discussion will use three different time-related terms: a time stamp is associated with a particular frame, specifically with respect to the original frame; a time step refers to the period between original content frames, associated with a constant frame rate; and time interval refers to the time between the original input frames as received by the video processor.

While the below discussion uses a block based MVC as an example, the block size can be 8×8 or 16×16, other methods of calculating motion vectors can be used. MVC will do motion estimation for 0/1 phase and each interpolated phase. For example if the input is film 32 and output frame is 120 hz as shown in FIG. 2, the process calculates the MV field with a phase of 0, 1, 0.2, 0.4, 0.6 and 0.8 between successive input frames. The phase value denotes the relative position of the anchor frame between P1 and CF frame.

To get better frame rate conversion (FRC) performance, 3D recursive MVC is used to speed up MVC process and produce more accurate MVs. It accomplishes this by assuming that the current frame MV is similar to the MV from the previous frame and/or the MV from spatially neighboring blocks. Therefore the MV from the previous MV field is used as candidate MVs in the 3D recursive algorithm. For the high-low motion case, current MVs and MVs from different period may have an abrupt change. This will cause the previous MV to be invalid and negatively impact the 3D recursive performance.

MV post-processing is used to reduce the halo effects. The halo reduction algorithm often uses multiple MV fields to detect the foreground and background MV, detect the occluded region, and correct the MV for occluded regions. If the MV fields from different frames have different high-low motion, the halo reduction logic will not work correctly.

Converting higher frame rate video to a lower frame rate often causes a different time interval between neighboring frames of the low frame rate video because a different number of frames need to be dropped between displayed frames. For example, a 15 Hz low frame rate video can come from many different frame rates. For example, it can come from 24 Hz frame rate video, case 0 as shown in FIG. 3; 25 Hz, case 1, as shown in FIG. 4; 30 Hz, case 2, as shown in FIG. 5; 48 Hz, case 3, as shown in FIG. 6; 50 Hz, case 4, as shown in FIGS. 7; and 60 Hz, case 5, as shown in FIG. 8. These figures show the mapping between the incoming frame rate and the 15 Hz low frame rate.

After frame dropping, the time interval may be different from frame to frame. For a given constant velocity of an object, the detected velocity will be proportional to time interval. For example, take case 1 in FIG. 3 as an example, the correct time intervals of 15 Hz video are not a constant 1/15 (1.67/25), but instead are; 2/25, 1/25, 2/25, 2/25, 1/25, 2/25, . . . . When the object is moving at a constant velocity, $v_0, v_1, v_2 \ldots v_9$ will be close to each other. For example, when converting 25 Hz to 15 Hz as shown in FIG. 9 the following relationships exist:

$$v_0+v_1 \approx 2*v_2,$$

$$v_3+v_4 \approx 2*v_2,$$

$$v_5+v_6 \approx v_3+v_4,$$

$$v_5+v_6 \approx 2*v_7.$$

Therefore $MV(P_2, P_3)$ will be 2× of $MV(P_1, P_2)$, $MV(CF, P_1)$ will be 2× of $MV(P_1, P_2)$. For each block in the current MV field (calculated between CF and P1, denote it with curmv) and each block from previous MV field (calculated between P1 and P2, denote it with premv) the following relation exists:

$$curmv.x \approx k*premv.x$$

$$curmv.y \approx k*premv.y$$

Where, x is the horizontal and y is the vertical motion components,

For the different frame dropping cases in FIGS. 3-8, k can be different values. For example, k can be 2 or 0.5 for case 0 and case 1; and k can be 4/3 or 3/4 for case 3 and case 4; can k will be 1 for case 2 and case 5. Furthermore, if a long enough clip is considered, the frame level k value will produce a repetitive pattern:

case 0: <u>1</u>, 0.5, 2, 0.5, 2, <u>1</u>, 0.5, 2, 0.5, 2
case 1: <u>1</u>, 0.5, 2, <u>1</u>, 0.5, 2, <u>1</u>, 0.5, 2
case 2: <u>1</u>, <u>1</u>, <u>1</u>, <u>1</u>, <u>1</u>, <u>1</u>, <u>1</u>, <u>1</u>, <u>1</u>, <u>1</u>, <u>1</u>
case 3: <u>1</u>, 1, 4/3, 3/4, 1, <u>1</u>, 1, 4/3, 3/4, 1
case 4: <u>1</u>, 4/3, 3/4, <u>1</u>, 4/3, 3/4,
case 5: <u>1</u>, <u>1</u>, <u>1</u>, <u>1</u>, <u>1</u>, <u>1</u>, <u>1</u>, <u>1</u>.

Figure 10:
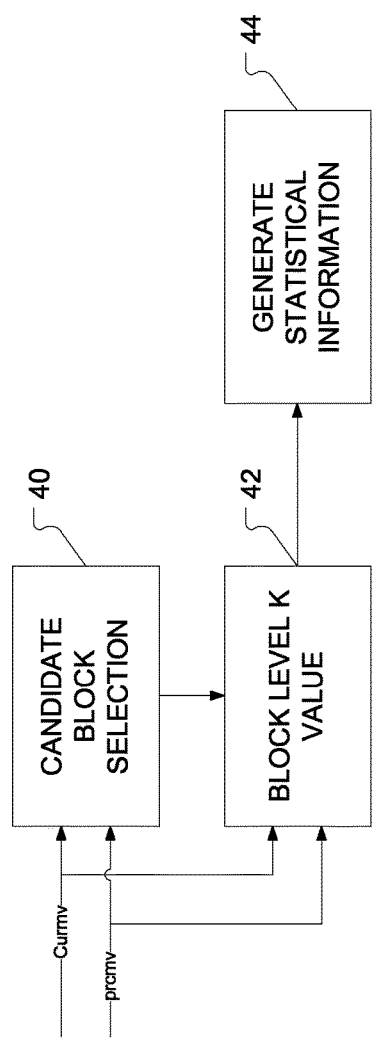
FIG. 10 shows an embodiment of a motion vector hi-low statistics calculation module.

The underlined "1's" represents the beginning of a new period. Therefore the change of k value overtime can identify the frame dropping case. To obtain the k value, the three modules shown in FIG. 10 may be added to an existing MVC block to get the motion statistical information required to determine the k values and their pattern. The current MV and the previous MV are received at the candidate block selection module 40 and the block level k value module 42. This is then used to generate the hi-low statistical information at 44.

Not all blocks contain motion vectors that are good candidates for determining the k values. Specifically, if the motion velocity is too low, then the k value calculated for the block will be unreliable. Therefore for the current MV (curmv) and previous MV (premv), calculate the minimum motion in the horizontal and vertical direction respectively, $$abs\_minx=min(|curmv.x|,|premv.x|)$$

$$abs\_miny=min(|curmv.y|,|premv.y|)$$

If abs_minx>Thr1 or abs_miny>Thr1, then select the larger of the two motion components selected for histogram statistics:

$$cur\_xy=(abs\_minx>=abs\_miny)?curmv.x:curmv.y;$$

$$pre\_xy=(abs\_minx>=abs\_miny)?premv.x:premv.y;$$

$$cur\_abs=|cur\_xy|$$

$$pre\_abs=|pre\_xy|$$

While in general the assumption that the true velocity of an object in a given block over time doesn't change, there are exceptions. Therefore, in the preferred embodiment, the true k value for a frame is found using a histogram approach. Each of the block level k values are classified into one of eight bins as shown below:

| | |
|---|---|
| if (cur_xy>0 && pre_xy<0) \|\| (cur_xy<0 && pre_xy>0)) | binidx=0; //outlier |
| else if (cur_abs>4*pre_abs \|\| pre_abs>4*cur_abs) | binidx =0; //outlier |
| else if (cur_abs>5*pre_abs/2) | binidx =7; //3:1 |
| else if (cur_abs>5*pre_abs/3) | binidx =6; //2:1, |
| else if (cur_abs>7*pre_abs/6) | binidx =5; //4:3, |
| else if (pre_abs>5*cur_abs/2) | binidx =1; //1:3 |
| else if (pre_abs>5*cur_abs/3) | binidx =2; //1:2 |
| else if (pre_abs>7*cur_abs/6) | binidx =3; //3:4 |
| else binidx =4; //1:1. | |

After the complete frame has been processed, the mode of the histogram (BinIdxMax), the count for that bin (BinCnt- Mode) and the sum of the counts for all the bins (BinCntAll) are determined. If the BinCntMode>Thr2*BinCntAll, then current BinIdxMax will be regarded as reliable one.

For a 15 Hz source, which has been created by dropping frames from a higher frame rate, the BinIdxMax value calculated in previous section will change based on the frame rate of the original video. Table 1 shows the BinIdxMax and frame interval for different frame dropping cases.

TABLE 1

| | Original Frequency | Basic Time Step(ms) | BinIdxMax | Frame interval |
|---|---|---|---|---|
| Case 0 | 24 | 1000/24 | <u>4</u>, 2, 6, 2, 6, <u>4</u>, 2, 6, 2, 6 | <u>2</u>, 1, 2, 1, 2, <u>2</u>, 1, 2, 1, 2 |
| Case 1 | 25 | 1000/25 | <u>4</u>, 2, 6, <u>4</u>, 2, 6, <u>4</u>, 2, 6, | <u>2</u>, 1, 2, 2, 1, 2, <u>2</u>, 1, 2, |
| Case 2/5 | 30/60 | 1000/30 | <u>4</u>, <u>4</u>, <u>4</u>, <u>4</u>, <u>4</u>, <u>4</u>, <u>4</u>, <u>4</u>, 4 | <u>2</u>, <u>2</u>, <u>2</u>, <u>2</u>, <u>2</u>, <u>2</u>, <u>2</u>, 2 |
| Case 3 | 48 | 1000/48 | <u>4</u>, 4, 5, 3, 4, <u>4</u>, 4, 5, 3, 4, | <u>3</u>, 3, 4, 3, 3, <u>3</u>, 3, 4, 3, 3, |
| Case 4 | 50 | 1000/50 | <u>4</u>, 5, 3, <u>4</u>, 5,3 | <u>3</u>, 4, 3, <u>3</u>, 4, 3, |

Based on Table 1 some basic templates were defined to represent different frame dropping case, see Table 2.

TABLE 2

| | Original frequency | Basic Time Step(ms) | Template for BinIdxMax | Template for Frame Interval |
|---|---|---|---|---|
| Case 0 | 24 | 1000/24 | <u>4</u>, 2, 6, 2, 6 ($T_0$, $l_0 = 5$) | <u>2</u>, 1, 2, 1, 2 |
| Case 1 | 25 | 1000/25 | <u>4</u>, 2, 6, <u>4</u>, 2, 6 ($T_1$, $l_1 = 6$) | <u>2</u>, 1, 2, 2, 1, 2 |
| Case 2/5 | 30 | 1000/30 | <u>4</u>, <u>4</u>, <u>4</u>, <u>4</u>, <u>4</u>, <u>4</u>($T_2$, $l_2 = 6$) | <u>2</u>, <u>2</u>, <u>2</u>, <u>2</u>, <u>2</u>, 2 |
| Case 3 | 48 | 1000/48 | <u>4</u>, 4, 5, 3, 4($T_3$, $l_3 = 5$) | <u>3</u>, 3, 4, 3, 3, |
| Case 4 | 50 | 1000/50 | <u>4</u>, 5, 3, <u>4</u>, 5, 3($T_4$, $l_4 = 6$) | <u>3</u>, 4, 3, <u>3</u>, 4, 3 |

In Table 2 some basic templates for BinIdxMax are defined. Each template is denoted for BinIdxMax with $T_i$, and $l_i$ denotes the length of $T_i$.

Figure 11:
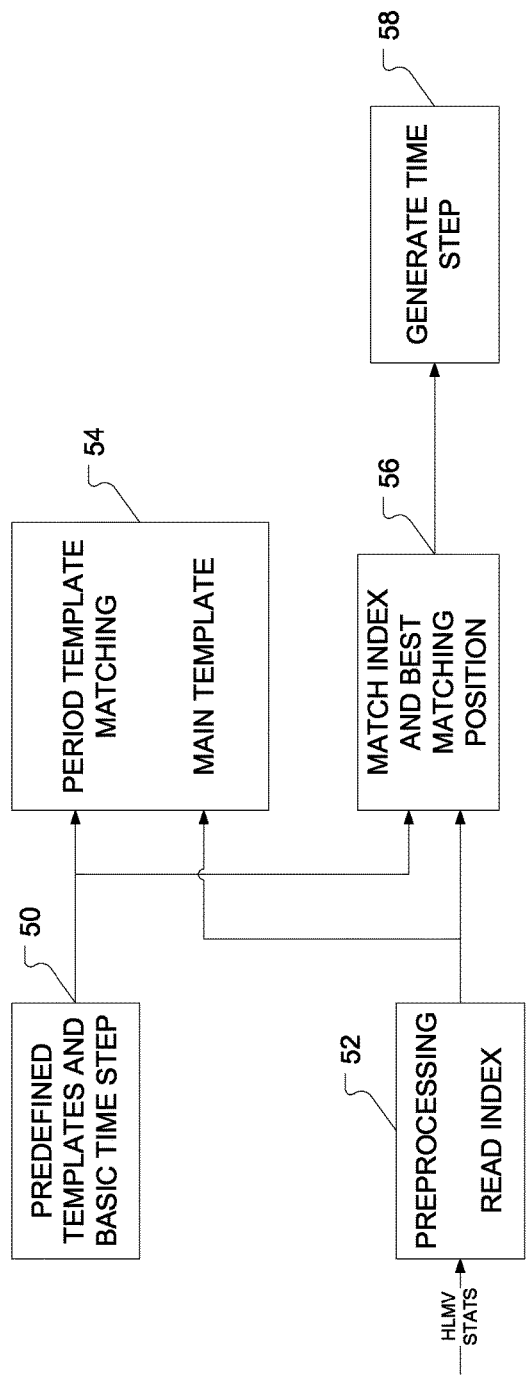
FIG. 11 shows an embodiment of a time stamp calculation module.

FIG. 11 shows an embodiment of a calculation of a time stamp for a frame. The preprocessing module 52 receives the hi-low motion statistics, reads BinIdxMax, checks its reliability, and combines it with the previous BinIdxMax values to create a history pattern (BinIdxMaxHist). At 54, the process then matches BinIdxMax with each template of the predefined templates and basic time step from 50, and finds the main template (TmpltIdx). For each predefined template, the process defines the count of the match value as $M_i$. For each predefined template $T_i$, the process selects the latest $l_i$ number of values from BinIdxMaxHist ($B_i$). The process then generates $l_i$ number of sub-template $ST_{ik}$ as $ST_{ik}=(T_i(k), T_i(k+1), \ldots, T_i(l_i-1), T_i(0), \ldots, T_i(k-1))$, here $k \in [0, l_i-1]$. The system then calculates the matching error between $ST_{ik}$ and $B_i$ one by one, and finds the minimal error among them at 56 to find the best matching position. The process then denotes this minimal error with $e_i$, and this value will be the matching error between $T_i$ and BinIdxMaxHist.

For all five predefined templates, the process will get the matching error $[e_0, e_1, e_2, e_3, e_4]$ and then finds the template with minimal matching error (for example $e_j$ is the minimal one). If the count of the reliable numbers in BinIdxMaxHist is larger than Thr3, then $M_j=M_j+1;$ $M_i=\max(0,M_i-1)$, here $i \neq j$.

The process then finds the index that has the maximal value among ($M_0$, $M_1$, $M_2$, $M_3$, $M_4$), and denotes it as TmpltIdx. The process then matches the BinIdxMaxHist with the main template again to find the best matching position (TmpltPos). The process then uses TmpltIdx and TmpltPos to get the frame interval from last column template. The predicted time interval will be frame interval multiple with the base time step of original source. For example, if TmpltIdx=1, and TmpltPos=2, the frame interval will be 2, and the predicted time interval, if MVC is between P1 and CF, then the predicted time step is for between CF and F1, denote it with $TStep_{CF\_F1}$) will be 2*1000/25=2000/25 (ns).

Typically, MEMC uses a fixed distance between phases for interpolation where the distance is measured as a fraction of the distance between the two frames being used. For example, when converting 24 Hz to 120 Hz, the distance between phases is 0.2 because there are 5 output frames for every input frame used in the interpolation process. If this approach was applied to the high/low motion case, because the time between frames used in the interpolation process is no longer equal, then the output would still contain a high/low motion artifact and the MEMC quality would be poor. Therefore the MEMC process should use the time steps calculated above to improve performance.

To make MVs between different time periods match each other, it is necessary to scale the MVs value according to timestamp. Suppose MVC works between P1 and CF, then calculate scale factor: $nScale=(TStep_{CF\_P1})/(TStep_{P1\_P2})$. For recursive MVC, MVs that are from the previous period (such as between P2 and P1) should be scaled to match with the MV between P1 and CF by applying a scale factor. That is MV'=MV/nScale.

Similarly other MVs that are calculated based on the P2 and P1 field should also be scaled by the same factor: previous regional MV, foreground/background MV and global MV. Part of the process for reducing halo requires using the current MV to point to a MV in the previous field and compare the current MV with the previous MV. In this case, the current MV needs to be scaled by the inverse of the value used. That is, MV'=MV/nScale. Finally, the FI phases that need to be calculated need to be adjusted by the high/low motion. For the given output frame rate, the time step of neighboring output frames is: $TStep_{FI}=1000/$out_frame_rate (ns). To calculate FI phase between P1 and CF, the process has the predicted time step $TStep_{CF\_P1}$. The last FI phase is the phase between P2 and P1, and the time interval between this phase and P1 is $TStamp_{Residual}$.

The process then calculates the FI phases:

$TStamp_{FIPre}$ = - $TStamp_{Residual}$;
Phase_Num=0; // number of FI phase between P1 and CF
$TStamp_{FICur}$ = $TStamp_{FIPre}$ + $TStep_{FI}$;
While ($TStamp_{FICur}$< $TStep_{CF\_P1}$)
{
FIPhase[Phase_Num] = min(64, ((64* $TStamp_{FICur}$ + $TStep_{CF\_P1}$/2)/$TStep_{CF\_P1}$);
$TStamp_{FIPre}$ = $TStamp_{FICur}$;
Phase_Num++;
$TStamp_{FICur}$ = $TStamp_{FIPre}$ + $TStep_{FI}$;
}
$TStamp_{Residual}$ = $TStep_{CF\_P1}$ - $TStamp_{FIPre}$;
//update this value for next time iteration After this iteration, the result is the interpolated FI phase number between P1 and CF, and the corresponding phase values.

In this manner, one can generate interpolated phases that result in interpolated frames from low frame rate video sequences. The interpolated frames are used to provide much more accurate motion vectors for motion error motion correction (MEMC) processes using the low frame rate videos.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of performing motion vector correction in a sequence of video frames, comprising:
    receiving, at a processor, a sequence of video frames at a received rate lower than an original frame rate, the sequence of video frames having fewer frames than an original sequence of video frames;
    identifying motion vectors for frames in the sequence of video frames;
    identifying a high-low pattern of motion vector magnitudes over a period of time;
    determining a location of dropped frames from the original sequence of video frames based on the high-low pattern;
    generating frame interpolation phases based on the high-low pattern;
    adjusting magnitudes of the motion vectors based on the high-low pattern to determine motion vectors for each of the frame interpolation phases; and
    interpolating a new frame of video data at each of the frame interpolation phases.

2. The method of claim 1, wherein identifying the high-low pattern comprises identifying high motion vectors that have higher than expected motion and identifying low motion vectors that have lower than expected motion, producing the high-low pattern.

3. The method of claim 2, further comprising detecting a cadence of the sequence of video frames using the motion vectors to determine a time step, wherein detecting the cadence comprises using the high-low pattern to determine the time step.

4. The method of claim 3, wherein using the high-low pattern to determine the time step comprises finding a correlation pattern.

5. The method of claim 3, wherein using the high-low pattern to determine the time step comprises matching the high-low pattern to a predefined template.

6. The method of claim 1, wherein interpolating the new frame of video data comprises generating new phases that have a constant period according to a time stamp.

7. A method of performing motion vector correction in a sequence of video frames, comprising:
    receiving, at a processor, a sequence of video frames at a received rate lower than an original frame rate, the sequence of video frames having fewer frames than an original sequence of video frames;
    identifying motion vectors for a frame in the sequence of video frames;
    identifying a high-low pattern of motion vector magnitudes over a period of time;
    determining a location of dropped frames from the original sequence of video frames in the sequence using the motion vectors;
    adjusting magnitudes of the motion vectors based on the high-low pattern;
    interpolating at least one new frame of video data using the adjusted magnitudes of the motion vectors.

8. The method of claim 7, further comprising detecting a cadence of the sequence of video frames using the motion vectors to determine a time step, wherein detecting the cadence comprises using the high-low pattern to determine the time step.

9. The method of claim 7, wherein identifying the high-low pattern comprises identifying high motion vectors that have higher than expected motion and identifying low motion vectors that have lower than expected motion, producing the high-low pattern.

10. The method of claim 9, wherein detecting the cadence comprises using the high-low pattern to determine the time step.

11. The method of claim 10, wherein using the high-low pattern to determine the time step comprises finding a correlation pattern.

12. The method of claim 10, wherein using the high-low pattern to determine the time step comprises matching the high-low pattern to a predefined template.

13. The method of claim 10, wherein interpolating the at least new frame of video data comprises generating new phases that have a constant period according to a time stamp.

* * * * *